United States Patent [19]

Kaneko et al.

[11] Patent Number: 5,534,675
[45] Date of Patent: *Jul. 9, 1996

[54] POWER SUPPLY SYSTEM FOR ELECTRIC DISCHARGE MACHINES

[75] Inventors: Yuji Kaneko; Shinji Ito, both of Kanagawa, Japan

[73] Assignee: Sodick Co., Ltd., Yokohama, Japan

[*] Notice: The term of this patent shall not extend beyond the expiration date of Pat. No. 5,126,525.

[21] Appl. No.: 341,228

[22] Filed: Dec. 2, 1994

Related U.S. Application Data

[60] Continuation of Ser. No. 156,067, Nov. 23, 1993, Pat. No. 5,386,095, which is a division of Ser. No. 818,536, Jan. 9, 1992, Pat. No. 5,298,709, which is a division of Ser. No. 429,794, Oct. 31, 1989, Pat. No. 5,126,525.

[30] Foreign Application Priority Data

Nov. 1, 1988 [JP] Japan ................................. 63-276957
Nov. 1, 1988 [JP] Japan ................................. 63-276958
Nov. 16, 1988 [JP] Japan ................................. 63-289837

[51] Int. Cl.$^6$ ............................................. B23H 1/02
[52] U.S. Cl. ................................. 219/69.13; 219/69.18
[58] Field of Search ........................... 219/69.13, 69.18

[56] References Cited

U.S. PATENT DOCUMENTS

| | | | |
|---|---|---|---|
| 3,532,850 | 10/1970 | Schulz et al. ........................ | 219/69.13 |
| 3,655,936 | 4/1972 | Saito et al. ........................... | 219/69.13 |
| 3,655,937 | 4/1972 | Ullmann et al. ...................... | 219/69.18 |
| 3,668,361 | 6/1972 | O'Conner ............................. | 219/69.13 |
| 3,670,136 | 6/1972 | Saito et al. ........................... | 219/69.13 |
| 3,778,579 | 12/1973 | Takarada .............................. | 219/69.13 |
| 3,825,715 | 7/1974 | Saito et al. ........................... | 219/69.18 |
| 3,832,510 | 8/1974 | Pfau et al. ............................ | 219/69.13 |
| 3,843,864 | 10/1974 | Wohlabaugh ........................ | 219/69.13 |
| 3,892,936 | 1/1975 | Kobryashi et al. ................... | 219/69.18 |
| 3,956,609 | 5/1976 | Marendaz ............................. | 219/69.18 |
| 3,974,357 | 8/1976 | Saito et al. ........................... | 219/69.13 |
| 3,987,269 | 10/1976 | Inoue et al. ........................... | 219/69.13 |
| 4,237,370 | 12/1980 | Ullmann ............................... | 219/69.18 |
| 4,258,243 | 3/1981 | Bell, Jr. et al. ...................... | 219/69.13 |
| 4,267,423 | 5/1981 | Bell, Jr. et al. ...................... | 219/69.13 |
| 4,310,741 | 1/1982 | Inoue ................................... | 219/69.13 |
| 4,347,425 | 8/1982 | Obara et al. ......................... | 219/69.13 |
| 4,350,863 | 9/1982 | Inoue . | |
| 4,427,871 | 1/1984 | Drushel et al. ...................... | 219/69.18 |
| 4,447,713 | 5/1984 | Tsurumoto et al. ................. | 219/69.18 |
| 4,469,927 | 9/1984 | Obara et al. ......................... | 219/69.13 |
| 4,503,309 | 3/1985 | Inoue ................................... | 219/69.17 |
| 4,655,888 | 4/1987 | Kilcher et al. ...................... | 204/129.43 |
| 4,673,789 | 6/1987 | Ozaki et al. ......................... | 219/69.12 |
| 4,678,884 | 7/1987 | Obara et al. ......................... | 219/69.18 |
| 4,678,885 | 7/1987 | Dresti et al. ......................... | 219/69.13 |
| 4,695,696 | 9/1987 | Ozaki et al. ......................... | 219/69.13 |
| 4,713,516 | 12/1987 | Buhler et al. ........................ | 219/69.18 |
| 4,725,769 | 2/1988 | Cini et al. ............................ | 323/283 |
| 4,800,248 | 1/1989 | Futamura et al. ................... | 219/69.18 |
| 4,945,199 | 7/1990 | Tanaka et al. ....................... | 219/69.13 |
| 5,083,001 | 1/1992 | Kinbara et al. . | |
| 5,187,341 | 2/1993 | Graell .................................. | 219/69.13 |
| 5,374,798 | 12/1994 | Kinbara ................................ | 219/69.18 |

FOREIGN PATENT DOCUMENTS 49-43297  4/1974  Japan .

(List continued on next page.)

*Primary Examiner*—Geoffrey S. Evans
*Attorney, Agent, or Firm*—Willian Brinks Hofer Gilson & Lione

[57] ABSTRACT

A power supply for an electroerosion machine having a switching element which controls the machining current in the gap. The value of the current is compared with a predetermined voltage and the signal generated based on this comparison is provided to a logic gate, advantageously an "AND" gate, whose output signal is applied to the control electrode of the switching element. Electrode consumption is reduced by using a generally step-type current waveform signal. Machining current during the discharge period may also be controlled to more closely approximate a square wave so that shifting to a faster machining rate can be easily accomplished by accepting some sacrifice in electrode consuption. Preferably, two or more switching and gating devices are used to permit gap current to flow intermittently during the entire discharge period.

17 Claims, 12 Drawing Sheets

FOREIGN PATENT DOCUMENTS

| | | |
|---|---|---|
| 52-18541 | 5/1977 | Japan . |
| 56-41367 | 9/1981 | Japan . |
| 57-33950 | 2/1982 | Japan . |
| 4-234732 | 8/1982 | Japan . |
| 58-102628 | 6/1983 | Japan ................................ 219/69.13 |
| 58-54938 | 12/1983 | Japan . |
| 61-4622 | 1/1986 | Japan . |
| 61-25722 | 2/1986 | Japan ................................ 219/69.13 |
| 61-288922 | 12/1986 | Japan ................................ 219/69.18 |
| 62-79914 | 4/1987 | Japan . |
| 62-27928 | 6/1987 | Japan . |
| 63-47019 | 2/1988 | Japan ................................ 219/69.18 |
| 63-102825 | 5/1988 | Japan ................................ 219/69.18 |
| 63-156618 | 6/1988 | Japan ................................ 219/69.18 |
| 63-312018 | 12/1988 | Japan ................................ 219/69.13 |
| 64-2817 | 1/1989 | Japan ................................ 219/69.13 |
| 3-55117 | 3/1991 | Japan . |
| 3-73220 | 3/1991 | Japan . |
| 3-208521 | 9/1991 | Japan . |
| 1432045 | 4/1976 | United Kingdom . |
| 1538313 | 1/1979 | United Kingdom . |

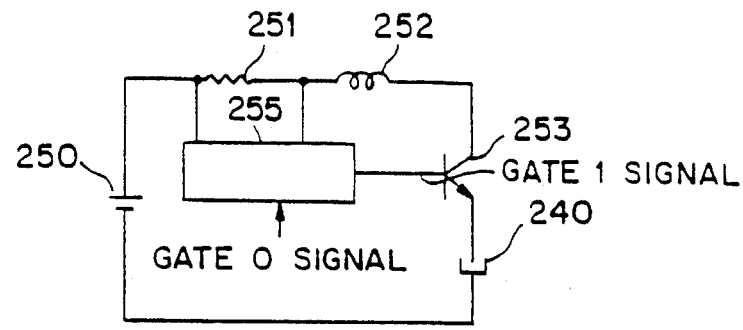
FIG. 1
(PRIOR ART)
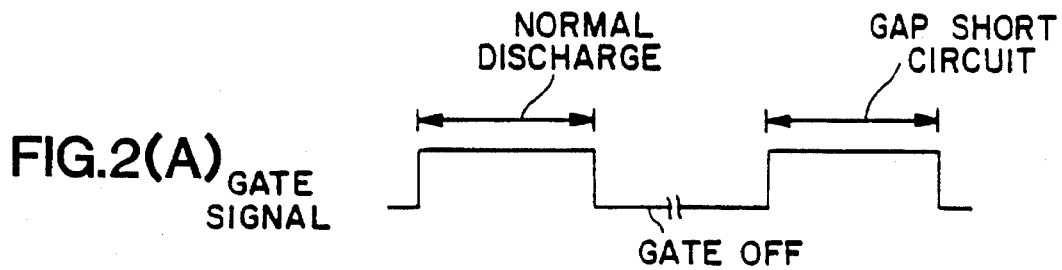
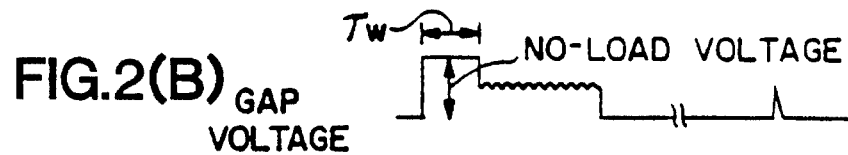
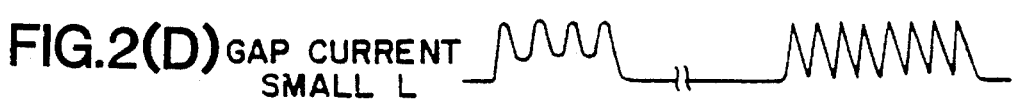

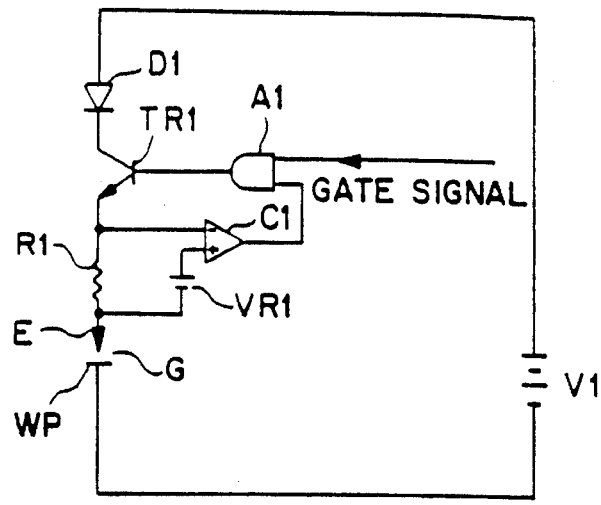
FIG.3
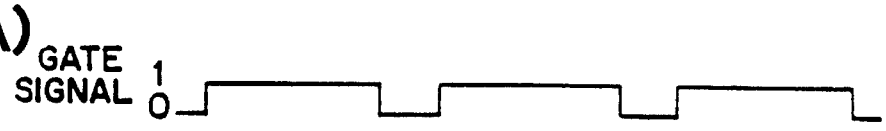
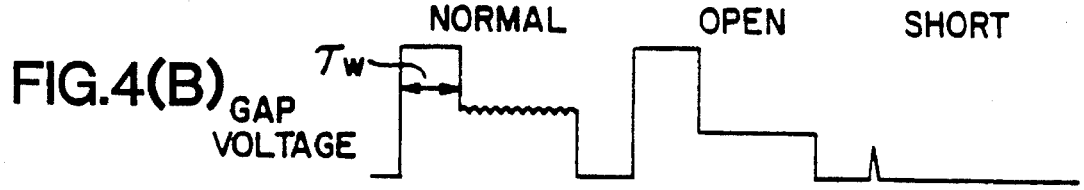

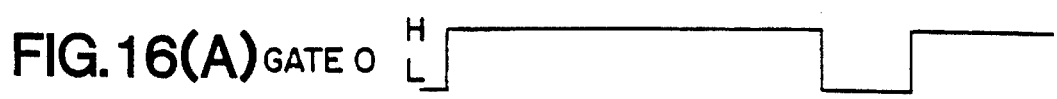
FIG.16(A) GATE 0
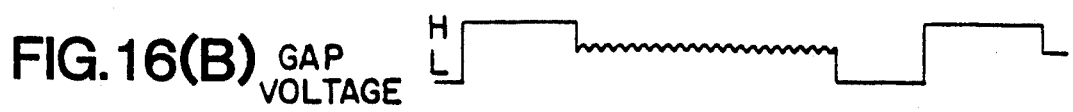
FIG.16(B) GAP VOLTAGE
FIG.16(C) GATE 1
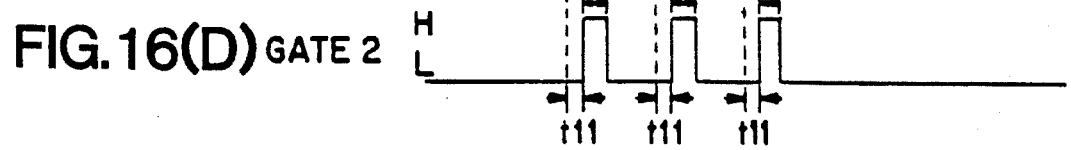
FIG.16(D) GATE 2
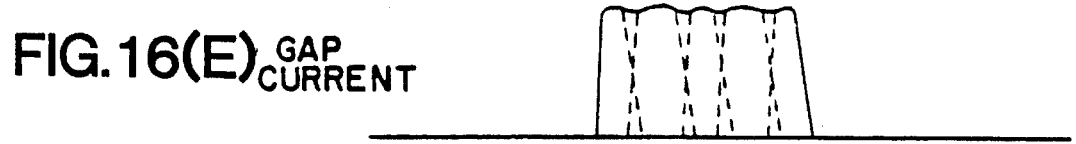
FIG.16(E) GAP CURRENT

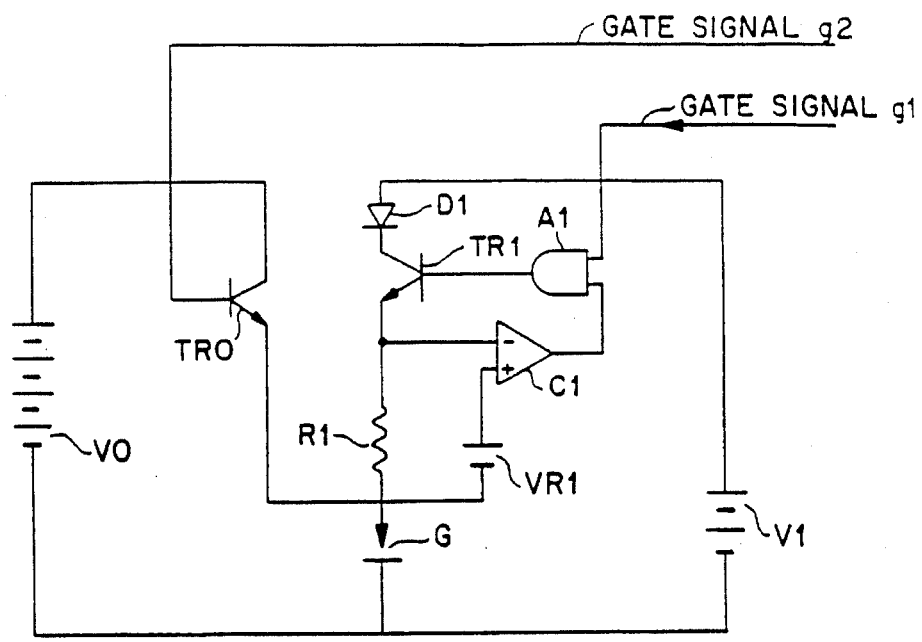
FIG. 17
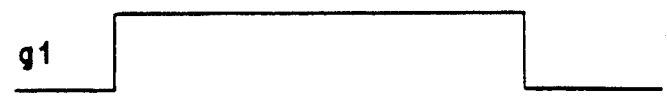
FIG. 18(A) GATE SIGNAL g1
FIG. 18(B) GATE SIGNAL g2
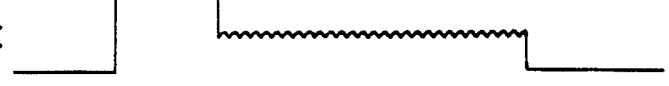
FIG. 18(C) GAP VOLTAGE
FIG. 18(D) GAP CURRENT

POWER SUPPLY SYSTEM FOR ELECTRIC DISCHARGE MACHINES

FIELD OF THE INVENTION AND BACKGROUND OF THE INVENTION

This application is a continuation of application Ser. No. 08/156,067 filed Nov. 23, 1993 now U.S. Pat. No. 5,386,095, which was in turn a divisional of application Ser. No. 07/818,536 filed Jan. 9, 1992, now U.S. Pat. No. 5,298,709, which in turn was a divisional of application Ser. No. 07/429,794 filed Oct. 31, 1989 now U.S. Pat. No. 5,126,525.

The present invention relates to a power supply system for electric discharge machining ("EDM") or other electroerosion machining equipment, and more particularly to an EDM power supply having an improved response to short-circuit conditions at the machining gap.

In conventional EDM equipment, a current limiting resistance is positioned in series with the gap to prevent excess current through the gap. However, when the gap experiences a short-circuit condition, a current which is greater than the normal machining current passes through the gap, usually causing an arcing condition.

In order to prevent arcing, a chopper circuit, i.e. a circuit in which current is intermittently passed through the gap during a single discharge period to lower the average power, has been used. An example of such a conventional chopper circuit is shown in FIG. 1. FIGS. 2(B) through 2(D), are timing charts which illustrate the gap voltage and current behavior in the circuit of FIG. 1 in response to the gate signal of FIG. 2(A). In FIG. 1, a current sensing resistance 251, a coil 252, a switching transistor 253 and the machining gap 240, are connected in series with a power supply 250. A current sensor 254 detects the current passing through the gap 240 via the current sensing resistance 251 and outputs a gate 1 signal which, when it is high, i.e., a digital 1, switches the transistor 253 to an ON position. The time during which the signal from the sensor 254 is high, determines the so-called ON period of the machining pulse or the period during which machining power is applied to the gap.

In the chopper circuit of FIG. 1, a coil 252 is used in order to produce a smooth machining current. However, the coil 252 acts to delay the start of discharge current flow through the gap; thus the integrated value of the discharge current through the gap is reduced and the EDM machining rate is reduced. As is known to one of skill in the art, as the discharge current pulse width is shortened, the machining rate is reduced. The gap current, for large and small values of coil 252 inductance (L), is illustrated in FIGS. 2(C) and 2(D), respectively.

As shown in Japanese Patent No. 62-27928, a signal having a considerably higher frequency than that of the gate signal (as shown in FIG. 2(A), the gate signal is a signal which stays high or at an ON-position during a period corresponding to the time during which voltage is applied to the machining gap) is supplied to a switching transistor, such as the transistor 253 in FIG. 1. When the current waveform is smoothed by an inductance section, such as the inductance 252 of FIG. 1, a relatively constant current is supplied to the gap. This generally constant current type of circuit is well known and, since the difference between the short-circuit current and a machining current is small, can usually prevent the induction of a short-circuit arc. If the power supply voltage is low, based on the time constant established by the current sensing resistance 251 and the inductance of the coil 252, steep current increases are prevented, thus resulting in the above-noted problem in that the machining rate is reduced.

In the example disclosed in Japanese Patent No. 62-27928, the magnitude of each of the currents in the discharge current waveform is depressed due to the effect of circuit inductance. In particular, when the peak machining current is 10 amperes or less, the machining rate becomes extremely low.

In order to reduce the energy required, attempts have been made to pass the machining current through the machining gap while the voltage level is reduced. Thus, the no-load voltage is reduced, and the machining waiting time, [τW], is extended. The waiting time is the time between the instant when voltage is applied to the machining gap and the time when a discharge current starts to flow. It is best illustrated in the left-hand part of the gap voltage depiction in FIG. 2(B). As a result of longer waiting times, the machining rate is reduced.

In EDMs which use water as a dielectric, an electrolytic current passes through the gap during the waiting time so that the gap voltage is reduced, sometimes causing a problem in that discharge does not occur.

Further, it is conventionally recognized that when selecting machining conditions for EDMing, the machining rate is reduced when electrode consumption is limited, but that generally electrode consumption is high when the machining rate is high. Therefore, the user must decide whether to emphasize electrode consumption or the machining rate in setting machining conditions. In the above-mentioned prior art example, there is a problem in that the discharge conditions for achieving minimal electrode consumption and high machining rate cannot be achieved.

In conventional systems, the generation of a step-like machining current waveform required use of a large number of transistors to pass the current. The entire system became large and complicated.

Further, as shown in FIG. 2(D), when a short-circuit condition exists at the gap, in conventional power supplies the waveform of the discharge current takes on an exaggerated zigzag shape, resulting in unexpected machining processes. For example, electrode consumption becomes extremely high, and the working rate is extremely low.

OBJECTS AND SUMMARY OF THE INVENTION

An object of the present invention is to provide a power supply for EDM equipment in which the machining current provided to the machining gap is improved and in which the induction of an arc during gap short-circuit condition is prevented and which, despite a lower gap voltage during abnormal gap conditions, maintains a relatively high machining rate. It is another object of the present invention to conserve energy while providing a power supply capable of increased machining rates.

Another object of the present invention is to provide am EDM power supply which, when used with a water-based machining fluid, causes an electrolytic current to be shifted in order to ensure discharge machining.

Another object of this invention is to provide a power supply for die-sinking or hole drilling EDMs which exhibits minimal electrode consumption.

It is also an object of the present invention to create a step-like machining current waveform in which the machining current is easily divided into several steps.

It is a further object of the present invention to minimize or eliminate the inductive component of the conventional prior art chopper circuit.

It is yet a further object of the present invention is provide a system for supplying discharge current for EDM equipment in which stable machining is performed without reducing the machining rate.

These as well as other objects and advantages are achieved in the present invention by providing a switching element which controls the discharge current in the gap. The value of the discharge current is compared with a reference voltage. The signal based on this comparative result is provided to a logic gate, advantageously an "AND" gate, whose output signal is applied to the control electrode of a switching element. Therefore, not only is induction of an arc during short circuit of the gap prevented, but the total current through the gap is increased even though the gap voltage is low. As a result, the reduction in machining rate experienced with the conventional chopper circuit is avoided.

In another aspect of the present invention, electrode consumption is reduced and the machining rate is increased by increasing the duty ratio in a section of a step-type current waveform signal having a relatively larger magnitude. In addition, with the present invention, the discharge current waveform during the discharge period may be controlled to more closely approximate a square wave discharge current so that shifting to a faster machining rate can be easily accomplished by accepting some sacrifice in electrode consumption rate.

In another aspect of the present invention, a device is described for enuring stable machining without suffering a loss in machining rate. Preferably, two or more switching and gating devices are used to permit gap current to flow intermittently during the entire discharge period.

Additional objects, advantages and novel features of the invention will be set forth in the description which follows and in part will become apparent to those skilled in the art upon examination of this disclosure.

BRIEF DESCRIPTION OF THE DRAWINGS

The accompanying drawings, which are incorporated in and form a part of this specification, illustrate various embodiments of the present invention and, together with the description, serve to explain the principles of the invention:

FIG. 1 is a schematic drawing of a prior art chopper circuit.

FIG. 2(A) through 2(D) represents various voltage and current waveforms for the circuit of FIG. 1 under varying conditions.

FIG. 3 is a schematic circuit diagram of a first embodiment of the invention.

FIGS. 4(A) through 4(C) represents gate voltage and current waveforms as a function of time during operation of the circuit of FIG. 3.

FIGS. 16(A) through 16(E) comprise a timing chart illustrating the operation of the circuit of FIG. 14.

FIG. 17 is a schematic circuit diagram illustrating a variation of the circuit of FIG. 5.

FIGS. 18(A) through 18(D) comprise a timing chart illustrating the operation of the circuit of FIG. 17.

DETAILED DESCRIPTION OF THE INVENTION

Figure 5:
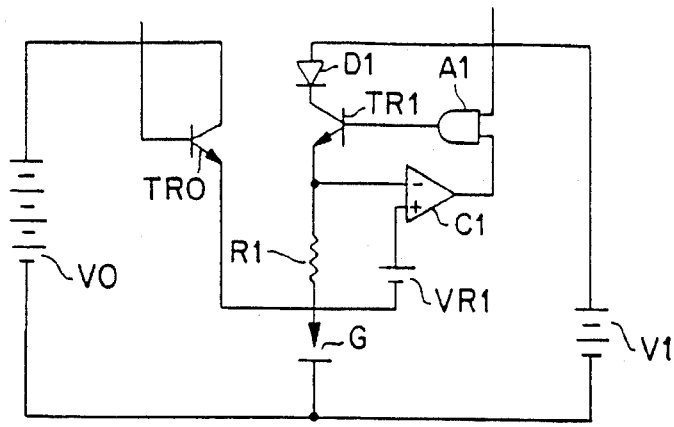
FIG. 5 is a schematic circuit diagram of another embodiment of the invention.

Reference will now be made in detail to the presently preferred embodiments of the invention, examples of which are illustrated in the accompanying drawings. In the various figures, parts which perform similar functions are identified by similar reference numerals.

Turning first to the example of FIG. 3, there is illustrated a power source V1, a diode D1, a switching transistor TR1, a resistance for current detection R1, and a machining gap G, all connected in series. The machining gap G is formed between a tool electrode, E, and a work piece, WP,.

A comparator C1 compares the voltage across the resistor R1 with a reference voltage source VR1 and outputs a high or "1" signal when the current through the resistor R1 creates a voltage drop below that of the reference voltage VR1. An AND gate A1 takes the output signal from the comparator C1, and a gate signal (a signal which is ON, i.e. at a logical high level, during a period corresponding to the time during which power should be applied to the gap G) and produces an AND signal which drives the gate of switching transistor TR1.

The operation of the circuit of FIG. 3 will now be explained with reference to FIGS. 4(A) through 4(C). FIG. 4(A) illustrates the gate signal which, as alluded to above, is a signal having a high value or a value corresponding to a digital "1" during the time in which voltage should be applied to the gap G. This gate signal is input to one of the inputs of the AND gate A1 of FIG. 3. When the transistor TR1 is switched off, no current is passed through the resistor R1, so that no voltage drop occurs across it. As a result, the comparator C1 outputs a "1" signal. On receiving that output from the comparator, the transistor TR1 is turned on. However, at the instant when the transistor turns on, the amount of current through the resistor R1 is low, so that the voltage drop across R1 is also low. Thus, the output of the comparator C1 stays at "1".

After the transistor TR1 is turned on and the gap current increases, the voltage drop across the resistor R1 eventually exceeds the voltage of the reference voltage source VR1, and the output of the comparator C1 goes low, i.e. to a logical "0". Thereupon, the AND gate A1 outputs a logical "0" signal so that the transistor TR1 is turned off. In other words, the transistor TR1 only maintains an ON-state for a very short time after it is turned on.

As described above, when the transistor TR1 is turned off current flow through the gap current stops and the voltage drop across the resistor R1 goes low, so that the comparator C1 again outputs a "1" signal. Thereupon the AND gate A1 also outputs a "1" signal turning the transistor TR1 ON again. As the abovementioned operation is repeated, the AND gate intermittently generates a series of pulses having an extremely narrow pulse width compared to the pulse width of the gate signal and sends them to the base of the transistor TR1.

If the time constant for the current path for turning transistor TR1 on is adjusted to be very low (for example, if the inductance previously used is removed or minimized), the standing current waveform in the gap G is tremendously improved and the period from the OFF state of the transistor TR1 to its next ON state is shortened so that interruption in the discharge current can be either almost eliminated or minimized.

In FIG. 4(B), gap voltage waveforms for a normal discharge, open circuit and short circuit are illustrated. In FIG. 4(C) corresponding gap current waveforms for each of those gap conditions are illustrated.

In the above-mentioned example, a generally constant current circuit is formed so that in spite of the occurrence of a short circuit in the gap G, as illustrated in the right hand side of FIG. 4(B) and 4(C), the difference between the short current and the normal discharge current, as illustrated on the left-hand side of FIG. 4(C), is extremely small, and the induction of an arc discharge is prevented. In addition, in the above-mentioned example, since the time constant of the gap circuit can be set to be low and because the output of the comparator C1 is directly applied to the AND gate A1, the response time of the entire circuit is excellent and unnecessary interruptions of the discharge current are prevented.

In the embodiment of FIG. 5 another power source, V0, which has a higher voltage than the voltage of the power source V1, and whose current capacity is lower than that of V1, is used. The voltage source V1 in FIG. 5 corresponds to the power source V1 of FIG. 3. A switching transistor TR0, driven by the gate signal, controls the timing of the application of the power source V0 to the gap G.

In the circuit of FIG. 5, the voltage during the waiting time [τW], see FIG. 4(B), can be increased and the performance of each discharge can be ensured. This embodiment is particularly effective when the impedance of the gap is reduced, as in the case of a discharge machining in a water-based machining fluid.

Figure 6:
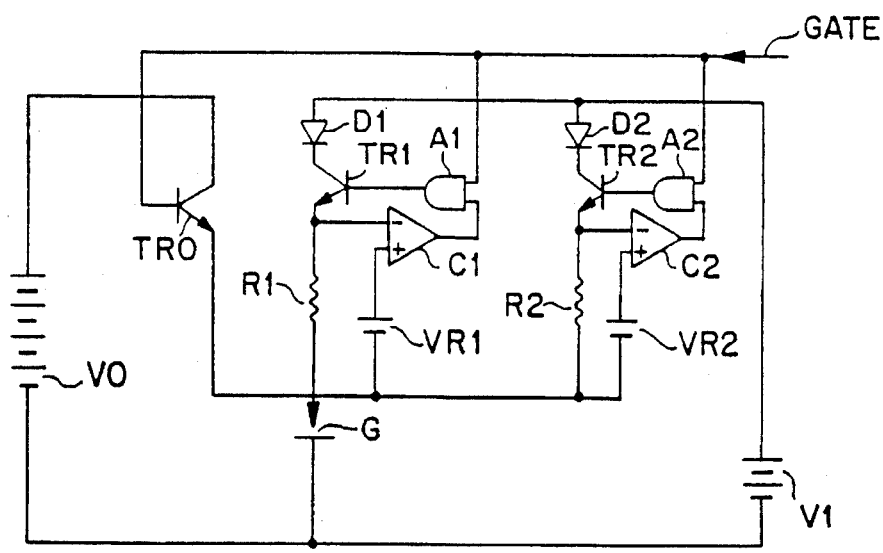
FIG. 6 is a schematic circuit diagram of a circuit illustrating another embodiment of the invention.

In the embodiment of FIG. 6, a first circuit comprising a diode D1, a transistor TR1, resistance for current detection R1, a comparator C1, a reference voltage source VR1 and an AND gate A1 are used in a manner similar to that described above with reference to FIG. 3. Another circuit comprising a diode D2, a transistor TR2, a resistance for current detection R2, a comparator C2, a reference voltage source VR2 and an AND gate A2, which correspond in structure and function to the corresponding parts of the first circuit, are connected in parallel with the first circuit. The resistance value of resistor R2 can be the same or different from that of the resistor R1. The voltage level of the reference voltage source VR2 can be the same or different from that of the reference voltage source VR1.

In FIG. 6, the current path for supplying the voltage from the power source V1 to the gap G is divided into two loops, and the impedance of the total discharge current path is the synthesized resistance of R1 and R2. Since these are parallel paths, the discharge current can be increased. If the switching timing is shifted (by changing the values of resistances R1 and R2, or by changing the voltages of reference voltage sources VR1 and VR2) ripples in the discharge current waveform can be controlled and minimized.

For example, if in the example of FIG. 6, any particular discharge current peak is high, a reduction in that peak can be made by changing one of the resistors R1 or R2, or by increasing one of VR1 or VR2 in order to improve the current waveform to more nearly approximate a square or rectangular wave so that the machining rate is improved, thus conserving energy.

As alluded to above, in the embodiment of FIG. 6, two discharge current loops are connected in parallel. As will be apparent to the artisan, three or more discharge current loops can also be connected in parallel. In other words, plural discharge current loops, each consisting of a switching device, a discharge current detecting device, a comparator device, and a gating device, or equivalent structures, can be connected in parallel. In this manner, current ripples can be minimized.

In the EDM systems which use water-based machining fluids, an electrolytic current may pass through the gap during the waiting time [τW]. As a result, the gap voltage is reduced and no discharge occurs. In the circuit of FIGS. 5 and 6, a voltage from the voltage source V0 is applied across the gap during the waiting period, i.e., no-load condition. This will ensure that, despite the tendency of the electrolytic current to lower the gap voltage, the gap will break down so that any electrolytic current flowing during the waiting period will continue during the subsequent discharging process and, as a result, high-speed machining can be realized.

Figure 7:
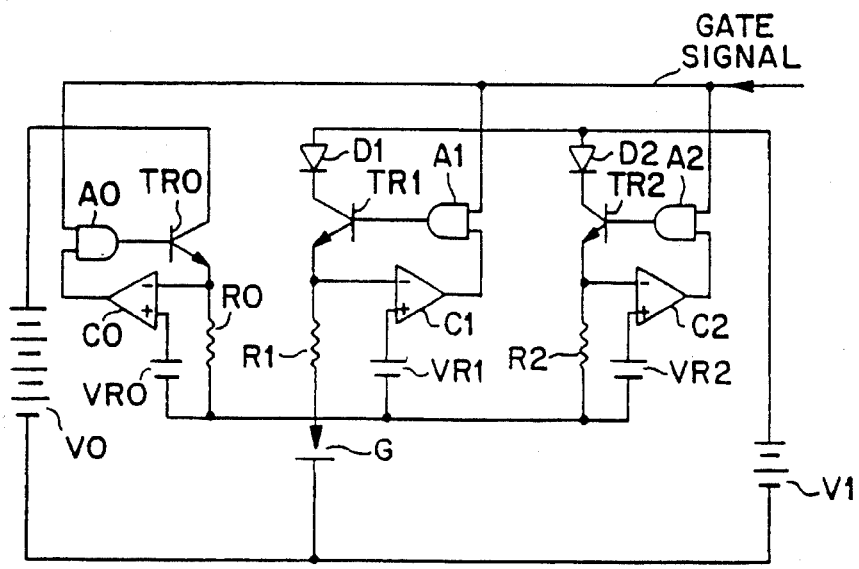
FIG. 7 is a schematic circuit diagram illustrating still another embodiment of the present invention.

In the embodiment of FIG. 7, a resistor, R0, for current detection is connected in series with a transistor TR0 and a voltage source VR0, a comparator C0, and an AND gate A0. A type of oscillator comprising the resistor R0, the comparator C0, the AND gate A0, and the transistor TR is formed by this loop. In other words, as explained above, the transistor TR0 is caused to shuttle between its ON and OFF states. This controls the gap current during the waiting time to prevent excess gap current. The two current loops which include voltage source V1 are similar to the corresponding current loops of FIG. 6.

As will be appreciated by the artisan, in the abovementioned examples, a Schmidtt trigger can be substituted for the comparators C1, C2 and C0.

According to the examples of FIGS. 3, 5, 6 and 7, the induction of an arc when the gap experiences a short circuit condition can be prevented and, in addition, the current waveforms in the gap can be controlled to more closely approximate an ideal discharge current, i.e., steep rise and absence of peaks indicative of short circuit, in spite of a lower gap voltage as compared to the prior art EDMs which use water-machining based machining fluids. As a result, the reduction in the rate experienced with the conventional EDMs can be prevented.

Figure 8:
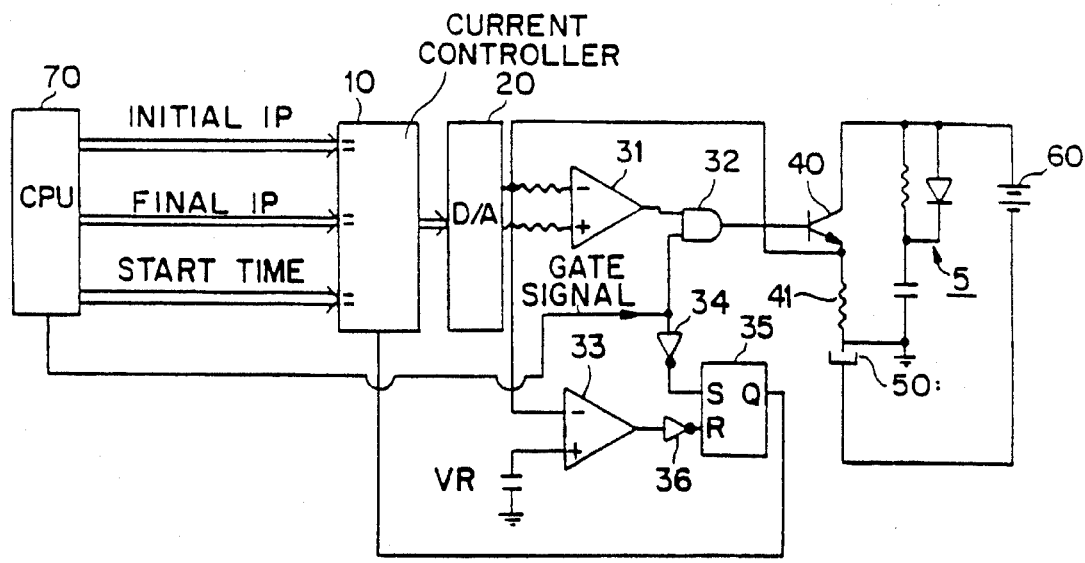
FIG. 8 is a schematic circuit diagram illustrating yet another embodiment of the invention.

In the embodiment of FIG. 8, a current waveform controller 10 is connected to provide a digital input to a D/A converter 20. The D/A convertor 20 is a circuit in which digital signals are converted to analog signals. The analog output of D/A convertor 20 is connected to comparators 31 and 33. An AND gate 32 has as inputs the output of the comparator 31 and the gate signal. The output of the AND gate 32 drives the transistor 40. The gate signal is also input to an inverter 34, whose output is connected to the set input of flip-flop 35. The reset input of flip-flop 35 is controlled by comparator 33. The machining power circuit includes a resistor for current detection 41, a gap 50 and a voltage source 60, all connected in series.

Preferably, the current waveform controller 10 includes three inputs: one for initial IP data, one for final IP data, and one for starting time control data. These inputs are generated by a CPU 70. The controller 10, together with the D/A convertor 20, outputs a step-type waveform signals as shown in FIG. 10(I).

The comparator 31, gate 32 switching transistor 40 and the current detecting resistor 41 form a type of oscillator to realize a chopper circuit with the reference voltage to the comparator 31 being the output of the D/A converter 20, i.e., a value which varies according to the analog output voltage of D/A 20. As will be appreciated by the artisan on review of the above, in this embodiment and in the embodiments discussed above, power can be intermittently supplied to the gap using any circuit which provides appropriate intermittent power. The comparator 33 detects discharge timing by comparing the signals from the current detecting resistor 41, with a reference voltage VR. The flip-flop 35 detects the discharge timing along with the comparator 33 and its output is used to control the current waveform controller 10.

As in the embodiments described above, the transistor 40 is a switching device for controlling the discharge current to the gap and repeatedly shuttles between its ON and OFF states during a single discharge period as defined by the gate signal. The transistor 40 may be advantageously operated to increase the duty ratio between the portion of the current waveform of FIG. 10(I) having the larger magnitude from that having the smaller magnitude.

The voltage drop across the resistor 41 is applied as an input to the comparator 31. A resistance, condenser and diode, collectively identified by the reference numeral S, are connected in parallel to the transistor 40 to form a circuit for surge absorption.

The CPU 70, which forms no part of the present invention, outputs data to the current controller 10 to control the discharge current waveforms so that during each discharge period the discharge current waveform has a generally square, rectangular or step type waveform. Equivalent information can be input directly by the operator or calculated and input by means other than a CPU.

Figure 9:
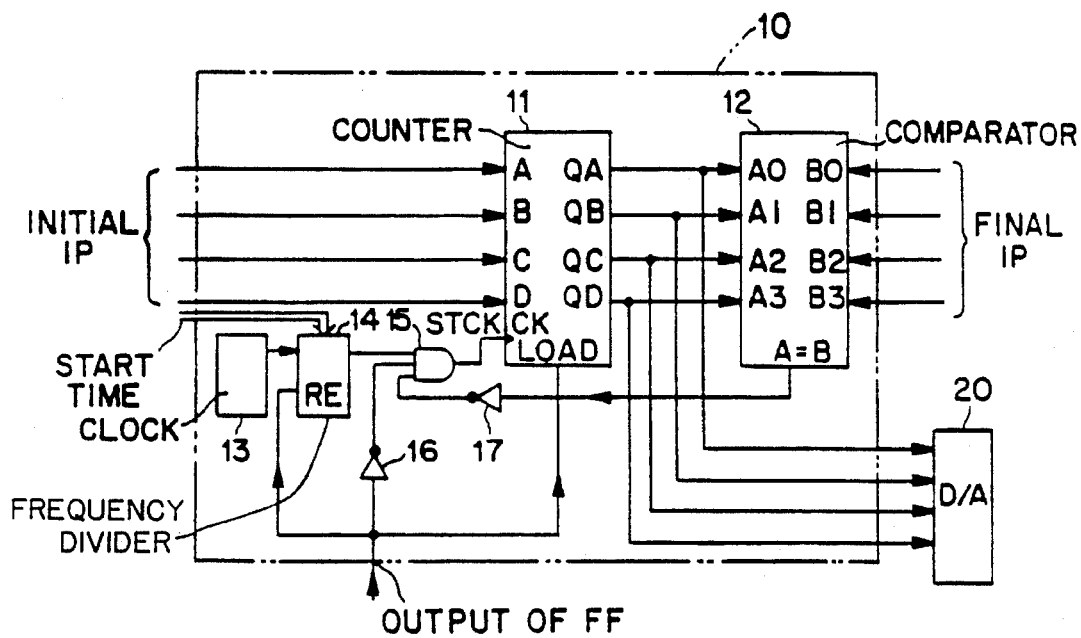
FIG. 9 is a schematic diagram illustrating a current waveform controller for the circuit of FIG. 8.

As illustrated in FIG. 9, the current controller 10 of FIG. 8 preferably includes a counter 11, a comparator 12, a clock generating circuit 13, a frequency dividing circuit 14, an AND circuit 15, and inverters 16 and 17.

The counter 11 reads the initial IP data from the CPU 70 when the Q outputs of the flip-flop 35 are set. Then, after the Q output of the flip-flop 35 is reset, i.e., goes low, the counter 11 starts to count clock pulses. The time during which the output of the flip-flop 35 is low corresponds to the discharge period.

The comparator 12 compares the outputs of the counter 11 with the final IP data from the CPU 70. When the outputs of the counter 11 are equal to the final IP data set in the comparator 12, a digital signal is fed back to the counter 11 from the A=B output of the comparator 12 via an inverter 17 and an AND circuit 15.

A frequency dividing circuit 14 controls the frequency dividing ratio according to a start time control signal (START TIME) from the CPU 70. The AND circuit 15 supplies a clock STCK signal (FIG. 10(H)) for counting up the counter 11 whenever there is no agreement in the comparator 12 between the final IP data and the Q outputs of the counter 11 during the discharge period, i.e., when the Q outputs of the flip-flop 35 are at a logical low or "0" level. The counter will then count clock signals of a frequency determined by the frequency divider 14.

The operation of the circuit of FIGS. 8 and 9 will now be explained by reference to FIGS 10(A) through 10(I).

Preferably, the CPU 70 supplies the gate signal. It may, of course, be supplied from a printed circuit board or by other conventional means. When the gate signal is at a logical "0", i.e., L, no discharge is generated because the AND gate 32 outputs an L signal, thereby turning off the transistor 40. Consequently, no voltage is impressed across the gap 50. At that time, since no current flows through resistor 41, the comparator 31 outputs an H signal.

When the gate signal goes high, i.e., to H (assuming initial low current in resistor R41), the AND circuit 32 outputs an H signal and the transistor 40 is turned ON, thereby impressing the voltage of the voltage source 60 across the gap 50. Initially, there is no discharge across the gap and no current flows through the resistor 41. At that time, comparators 31 and 33 generate H signals, thereby setting the flip-flop 35.

Figure 10:
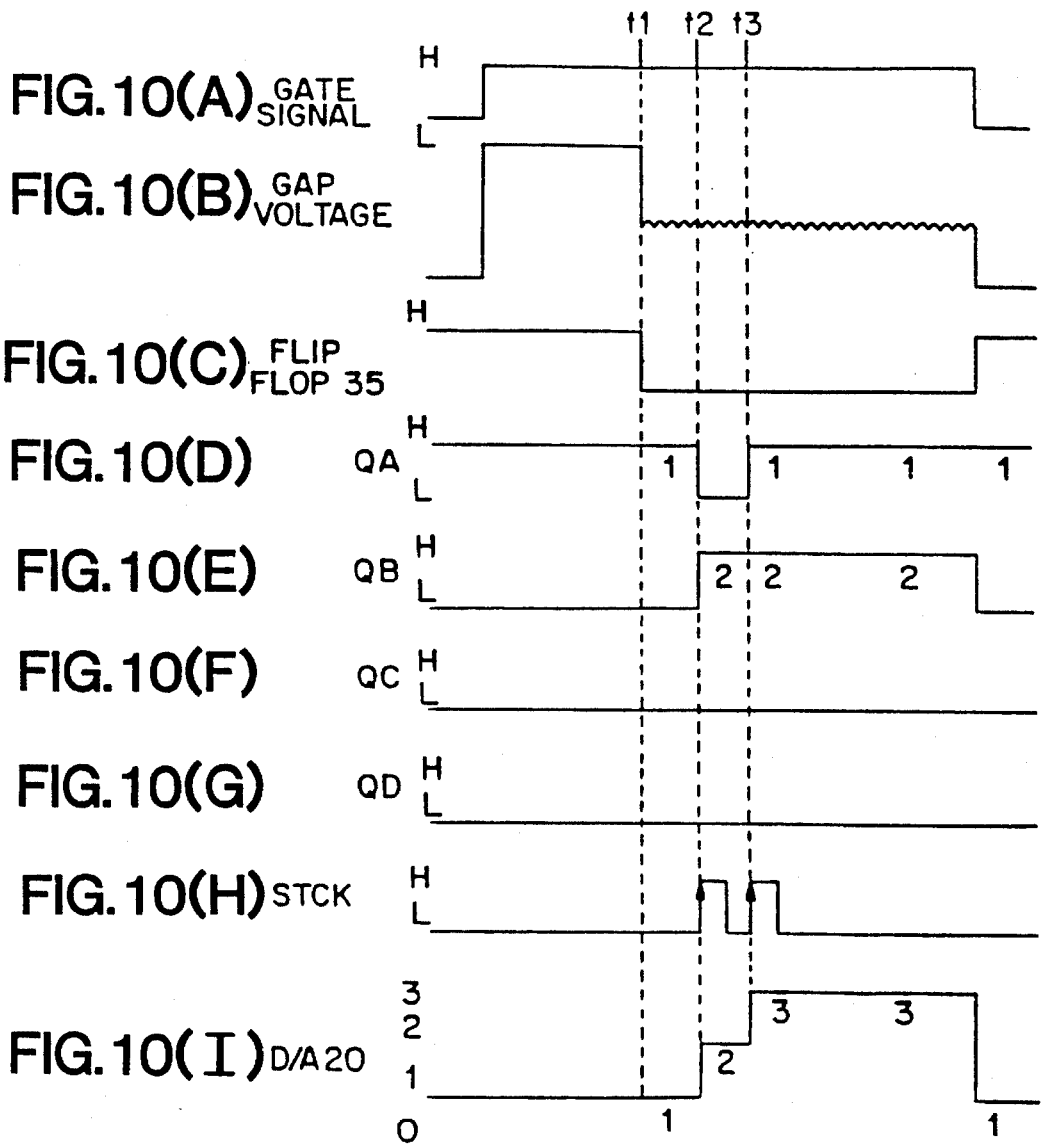
FIGS. 10(A) through 10(I) comprise a timing chart illustrating the operation of the current controller of FIG. 8.

At the time t1, as shown in FIG. 10, i.e., the instant when discharge begins, current begins to flow through the resistor 41. The voltage drop thereacross causes the comparator 33 to output an L signal, thereby resetting the flip-flop 35.

For example, assume a "1" is set as the initial IP data and a "3" is set as the final IP data in the current controller of FIG. 9. Then the initial IP data "1" is loaded in the counter 11 when the Q output of the flip-flop 35 is at H (when set). At this setting, only the output QA of the counter 11 is M, while the other outputs, QB, QC and QF, are at L. Only when QA is at H and QB, QC and QF are at L will the output signal of the D/A converter circuit 20 become a "1".

At time t2, the next STCK pulse from the frequency circuit 14 arrives at the counter 11 through the AND circuit 15. As this pulse represents an up count of one, it will cause the QB output of the counter 11 to go high and output an H. This causes the D/A converter 20 to output a "2". Since the output of the counter 11, i.e., a "2", does not equal the setting of the comparator "2" no A=B signal is generated and, as long as the FF 35 output Q remains low, the gate 15 will continue to pass clock pulses from the frequency divider 14. When the next STCK arrives, the counter 11, will count up one and will generate H outputs at QA and QB, i.e., a "3".

At this time, when the comparator 12 compares the output of the counter 11 with the final IP data, since both agree, an H signal is output from the A=B terminal of comparator 12, thereby closing the gate 15. At this time, the D/A convertor will output a "3" indicative of the count of the counter 11 which is now equal to the final IP data. Since the clock pulses are now gated off, even if the frequency circuit 14 generates additional clock pulses, those signals are prevented from reading the STCK input of the counter 11. Thus, the D/A circuit 20 will continue to generate a "3" output until the discharge described above is completed, i.e., until the gate signal (FIG. 10(A)) goes to L.

When the gate signal goes from H to L, the flip-flop 35 is set, and the counter 11 again loads the initial value of IP data, in this example a "1". Consequently, only when one or more of the outputs of the counter 11, for example QA, goes high, i.e., outputs an H during the next gate signal, will the D/A circuit 20 again output a "1". Thus, as illustrated in FIG.

10(I), the output of the D/A circuit 20 will have a step function wave shape.

However, during the discharge (when the flip-flop 35 is reset), the transistor 40 shuttles between its ON and OFF conditions. That is, even during the counting of timing pulses from the clock 13 and frequency divider 14, during the interval while the output level of the D/A circuit is fixed, for example at "1", or "2" or "3", the comparator 31 generates H and L signals continuously in the manner described above according to signals sent from the current detecting resistor 41. The transistor 40 is thereby switched ON and OFF repeatedly.

In other words, if little or no current is flowing through the resistor 41, the comparator 31 generates an H signal and switches the transistor 40 ON, so that current flows through the resistor 41. As the input to the negative side of the comparator 31 increases beyond a predetermined value established by the output of the D/A convertor 20, the comparator 31 generates an L signal, thereby turning the transistor 40 OFF and stopping the flow of electric current through the resistor 41. At that time, the comparator 31 will again output an H signal, turning the transistor 40 ON causing current to again flow through the resistor 41. By repeating this action, pulses of a predetermined frequency (and of a predetermined amplitude) are fed to the base of the transistor 40.

As the output of the D/A circuit 20 increases, the duration of output of the H signal by the comparator 31 is prolonged (i.e. the duty ratio is increased); and the ON time of the transistor 40, per unit of time, is increased. In short, the chopper circuit formed by the transistor 40, and the current detecting resistor 41; together with the current controller 10, the D/A circuit 20 and the gate 32 function as a duty ratio control circuit.

Figure 11:
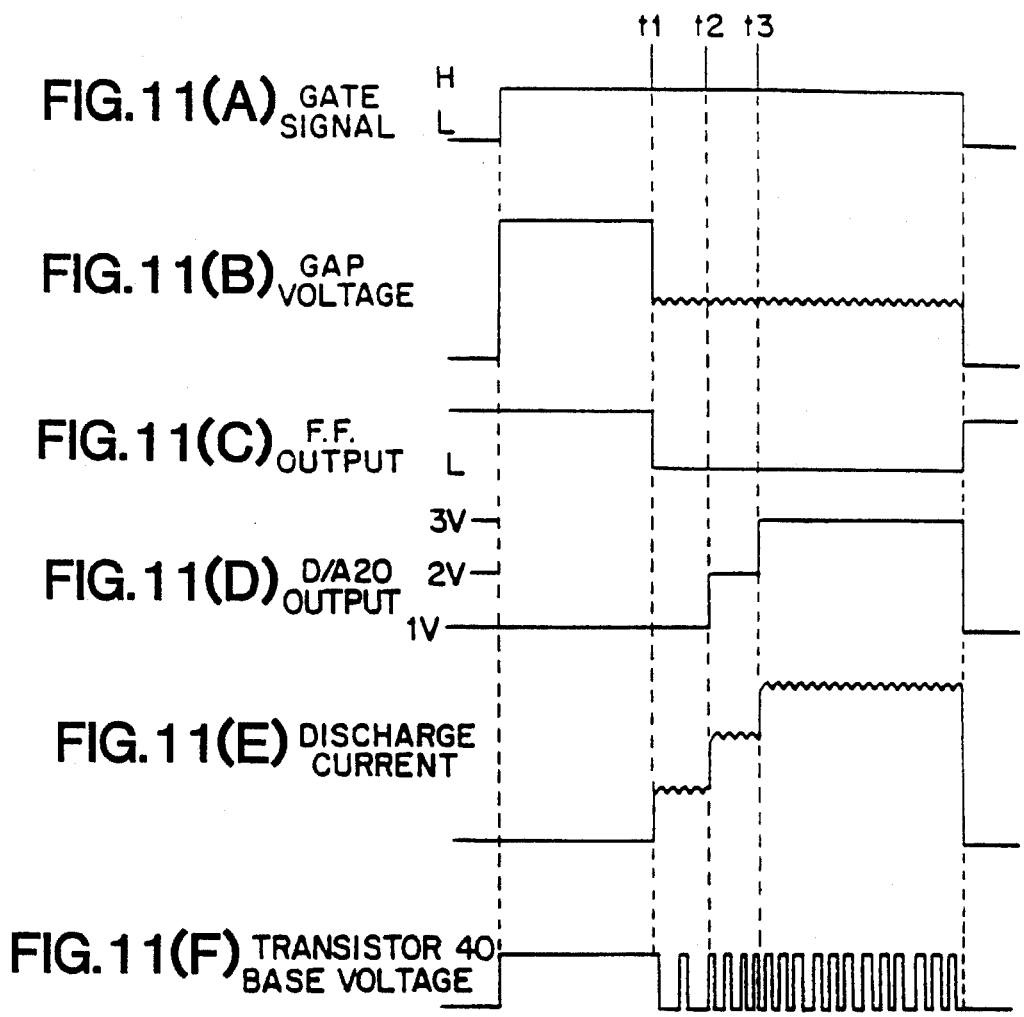
FIGS. 11(A) through 11(F) comprise a timing chart illustrating the operation of the circuit of FIG. 8.
Figure 12:
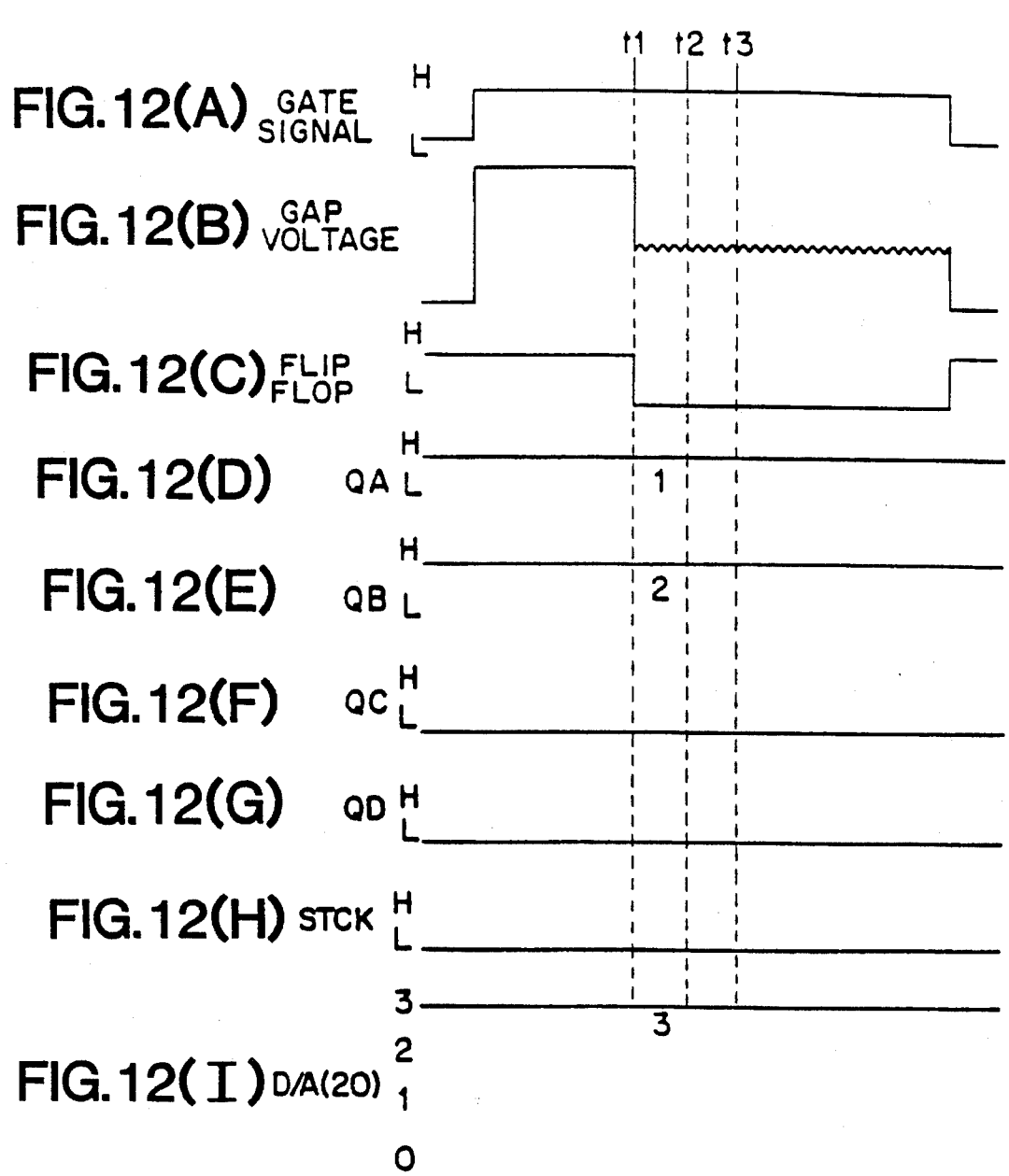
FIGS. 12(A) through 12(I) comprise a timing chart illustrating one mode of operation of the current controller of FIG. 9.

FIGS. 11(A) through 11(F) comprise a timing chart illustrating the operation of the circuit of FIG. 8 as described above. FIG. 11(D) illustrates the output of the D/A converter 20 of FIG. 8, as a step waveform, while FIG. 11(E), illustrates the actual discharge current and how it increases in accordance with the step function output of D/A converter 20. The signal driving base of the transistor TR 40 results in the characteristically wavy discharge current pattern.

Since the initiation of the discharge current in FIG. 11(E) is steep, the working or machining speed is fast, while the consumption of the electrode is minimized. Moreover, as will be known by one of skill in the EDM art, when the initiation of the discharge current waveform is steep, the "biting" of the discharge is good and machining speed is improved. Moreover, with the present invention the electrode consumption characteristic is as good as in conventional power supplies which do not enjoy the increased machining speed of the present invention.

FIGS. 12(A) through 12(I) and FIGS. 13(A) through 13(F) each comprise a timing chart illustrating the operation of the current wave controller of FIG. 9 and the circuit of FIG. 8 under different operating conditions. In FIGS. 12(A) through 12(I) and in FIGS 13(A) through 13(F) examples are illustrated where discharge current of one discharge cycle is made to approximate a square wave by equalizing the values of the initial IP date and the final IP data.

In this example, once the counter 11 of FIG. 9, takes the initial IP data (in this example "3") and as soon as comparator 12, outputs an A=B signal (signal of coincidence) the AND gate 15 closes i.e. goes low, the counter 11 can no longer count up. Consequently, the current controller 10 continues to output the same data (the initial IP data and the final IP data) i.e., a "3").

Figure 13:
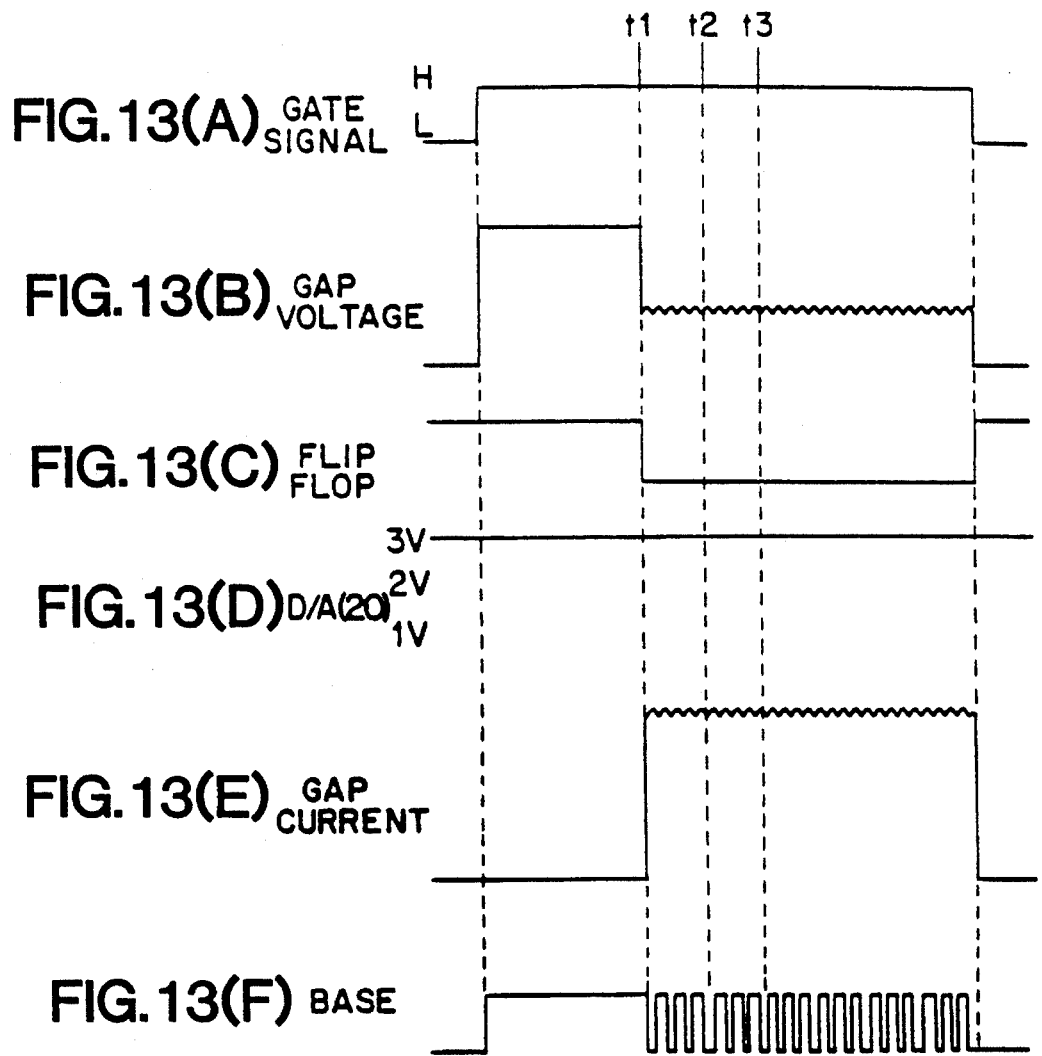
FIGS. 13(A) through 13(F) comprise a timing chart illustrating another mode of operation of the current controller of FIG. 9.

As shown in FIG. 13(E), when the output of the D/A convertor is "3", i.e., at t1, the gap discharge current increases steeply. In this example, if the duration of discharge is relatively short (e.g. 1 to 10 micro second), even though electrode consumption is increased, the processing speed is accelerated and good finish quality can be obtained.

As will be understood by one of skill in the art on reading this disclosure, one may use switching elements other than the transistor 40 mentioned above, for example an FET or other switching device can be advantageously employed. Further, although in the above example, the input to output frequency ratio "1" is applied to the frequency dividing circuit 14, other frequency ratio such as ½ or ¼ can be used. By doing this, the duration of each step in the current waveform can be altered to a desired value.

Figure 14:
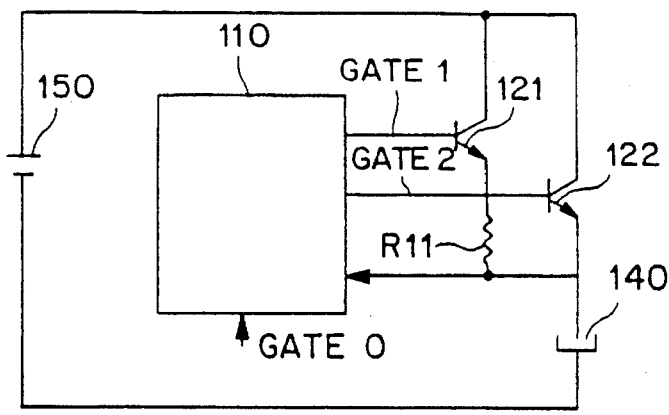
FIG. 14 is a schematic circuit diagram of another embodiment of the invention.

FIG. 14 is the schematic diagram of another embodiment of the invention. In FIG. 14 a discharge circuit comprising a transistor 121, and the power source 150, are connected in series with the machining gap 140. As explained above the transistor 121 is only an example of a switching device for intermittently turning ON during the prescribed period from the start of discharge.

Another transistor 122 is connected between the power source 150 and the gap 140. The transistor 122 is connected essentially in parallel to the transistor 121. The transistor 122, is used as a switching device to permit current to flow through the gap during the time when transistor 121 is OFF. Other types of switching devices e.g. an FET can also be advantageously employed.

In the embodiment of FIG. 14, an electric current controller 110, receives a signal designated as the gate 0 signal from a CPU or other device. As explained above, the gate 0 signal determines the duration of the machining pulse ON time. The controller 110 outputs a gate 1 signal and a gate 2 signal. The gate 1 signal is a control signal which controls the transistor 121 to pass current to the gap 140 as appropriate. The gate 2 signal is a control signal which controls the transistor 122 so as to turn the transistor 122 ON during the gate 1 signal OFF period.

The current controller 110 receives a signal from a current-detecting resistor R11, connected in series with the transistor 121. According to this detection signal, the controller 110 outputs either a gate 1 or a gate 2 signal.

Figure 15:
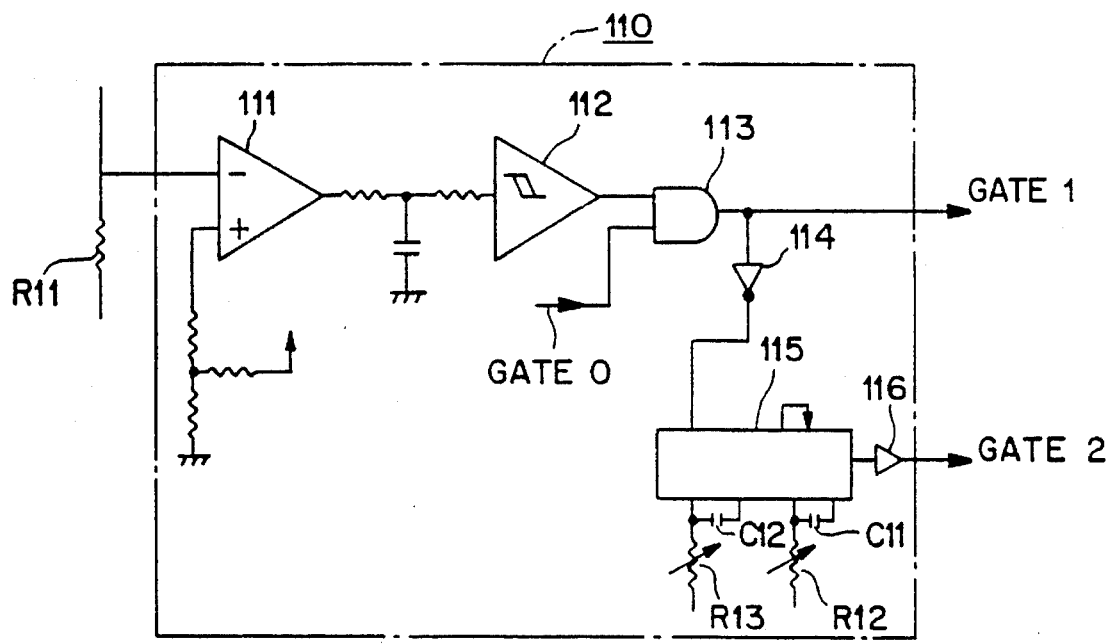
FIG. 15 is a schematic circuit diagram illustrating an example of a current controller for the circuit of FIG. 14.

FIG. 15 is a schematic circuit diagram illustrating an example of a current controller for the circuit of FIG. 14. In the example of FIG. 15 current is intermittently passed through the gap 140 through a type of oscillating circuit formed by the resistor R11, the comparator 111, Schmidt trigger 112 and an gate 113. As will be apparent to the artisan on review of this specification one may devise a circuit other than the above oscillating circuit to repetitively switch current into the gap 140.

As alluded to above, the control 110 includes a comparator 111, a Schmidt trigger circuit 112 connected to the comparator 111, an AND gate 113 which receives the output of the Schmidt trigger as one of its inputs, an invertor 114 connected to the output of the AND gate, a one-shot-multivibrator 115 connected to be triggered by the output of the invertor 114, and an amplifier 116 connected to the one-shot 115 to amplify the output thereof. The negative input terminal of the comparator 111 receives a signal from the resistor R11, while the positive input terminal receives a reference voltage input.

The one-shot-multivibrator 115 includes a condenser C11, and variable resistor R12, in one timing circuit, and a condenser C12, and variable resistor R13, in another timing circuit. The timing circuit comprising condenser C11, and resistor R12, is used to set the time t11 (e.g. 1,500 ns) from the going low of the pulse of the gate 1 signal to the going low of the pulse of the gate 2 signal as illustrated in FIG. 16. The timer circuit comprising the condenser C12, and resistor R13, is used to set the pulse width t12 of the gate 2 signal of FIG. 16.

The operation of the circuit of FIG. 15 will now be explained with reference to FIGS. 16(A) through 16(E).

As shown in FIG. 16(A), when the gate 0 signal in the above example is high, voltage is applied across the gap 140, and the gate 1 signal pulses are intermittently generated during the discharge period. After a time interval t11 following the instant the gate 1 signal goes low, i.e., L, the gate 2 signal goes high, i.e., to H. The gate 2 signal remains high while the gate 1 signal is low.

Assuming the gate 0 signal FIG. 16(A) is high, if the transistor 121 (FIG. 14) is OFF, no current will flow to the resistor R11 and the negative input to the comparator 111 becomes smaller than the positive input. The comparator 111 thereby generates an H signal. This H signal is, after a slight delay set at the output side of the comparator 111, sent to the AND gate 13 through a Schmidt trigger circuit 112. At this time the gate 0 signal is high and the AND circuit 113 generates an H signal. Consequently, the transistor 121 is turned ON.

When the transistor 121 is turned ON as described above, since a current flows through the resistor R11, the negative input of the comparator 111 becomes higher than the positive input and the comparator outputs a L signal. The L signal, slightly delayed by the delay circuit on the output side of the comparator 111, is sent to the AND circuit 113 through the Schmidt trigger circuit 112 and the AND circuit 113 thereon generates an L signal. Consequently the transistor is turned OFF.

These operations are repeated during the time the gate 0 signal remains high. In other words, while the gate 0 signal is at an H level, the, the Schmidt trigger circuit 112, the AND circuit 113, and the transistor 121, constitute a type of the oscillator, and the transistor 121, which is driven by the gate 1 signal, repeatedly turns ON and OFF. The ON time and OFF time of the gate 2 signal are determined according to the reference voltage on the positive input terminal of the comparator 111, the fixed time of the set in the RC circuit on the output side of the comparator 111, and the Schmidt trigger circuit 112. The gate 2 signal turns ON while the gate 1 signal is OFF. The duration t11, from the transition down of the gate 1 signal to the transition up of the gate 2 signal, is determined by the condensor C11, and the resistor R12 and the duration of each pulse of the gate 2 signal is determined by the condensor C12 and resistor R13.

Since the transistors 121, and 122, are turned ON and OFF sequentially, the time during which the power source 150 is not connected gap 140 is shortened, and, as shown in FIG. 16(E), the conventional zig-zag characteristic in the waveform of the gap current is drastically reduced. Subsequently, undesirable machining characteristics such as accelerated electrode consumption, etc. is avoided.

Further, in the example of FIGS. 14 and 15, since there is no need for a coil between the power source 150 and the gap 140, the rise of the discharge current in the gap 140 is steeper than in the prior art and the integrated value of the discharge current is larger resulting in increased machining speed. Further, in the example of FIGS. 14 and 15, even using a resistance between the power source and the gap, the discharged current waveform is generally smooth, see FIGS. 16(E).

As will be apparent to the artisan on reading this disclosure, although in the example of FIG. 14 two transistors are used, each turned ON and OFF by a different gate signal, one may increase the number of such gate signals and the number of the transistors. That is, one may use more switching elements. Further, one may use switching elements other than transistors such as FETs, etc. It will also be appreciated that the above switching elements can be controlled by a control device other than the controller 110 of FIG. 15.

The switching ON and OFF of current through the transistor 121, and the use of a gate signal such as the gate 0 signal to control a transistor is similar to that of the conventional chopper circuit shown in FIG. 1. However, the use of the gate 1 signal to drive the switching transistor ON and OFF and the one-shot multivibrator 115, which is triggered by the invertor gate 1 signal to generate the gate 2 signal have no counterpart in the chopper circuits.

FIG. 17 is a schematic circuit diagram illustrating a variation of the circuit of FIG. 5. In this variation, by using a gate signals g1 and g2, in the place of the gate signal used in FIG. 5, a power source V0 having less current capacity than the power source V0 of FIG. 5 may be used.

The gate signal g1, is input to one of the input terminals of the AND gate A1, while the gate signal g2, is input to the base of the transistor TR0. Other than its use of the gate signals g1 and g2, the circuit of FIG. 17 is similar to the circuit of FIG. 5.

FIGS. 18(A) through 18(D) comprise a timing chart illustrating the operation of the circuit of FIG. 17. The gate signals g1 and g2 are illustrated in FIG. 18(A) and FIG. 18(B), respectively. FIG. 18(C) and FIG. 18(D) illustrate the gap voltage and the gap current, respectively, obtained during operation of the circuit of FIG. 17. Since with the circuit of FIG. 17 a power source having greater current capacity can be used as the separate power source V0, the power source V0 is not limited to those having low current capacity.

Figure 19:
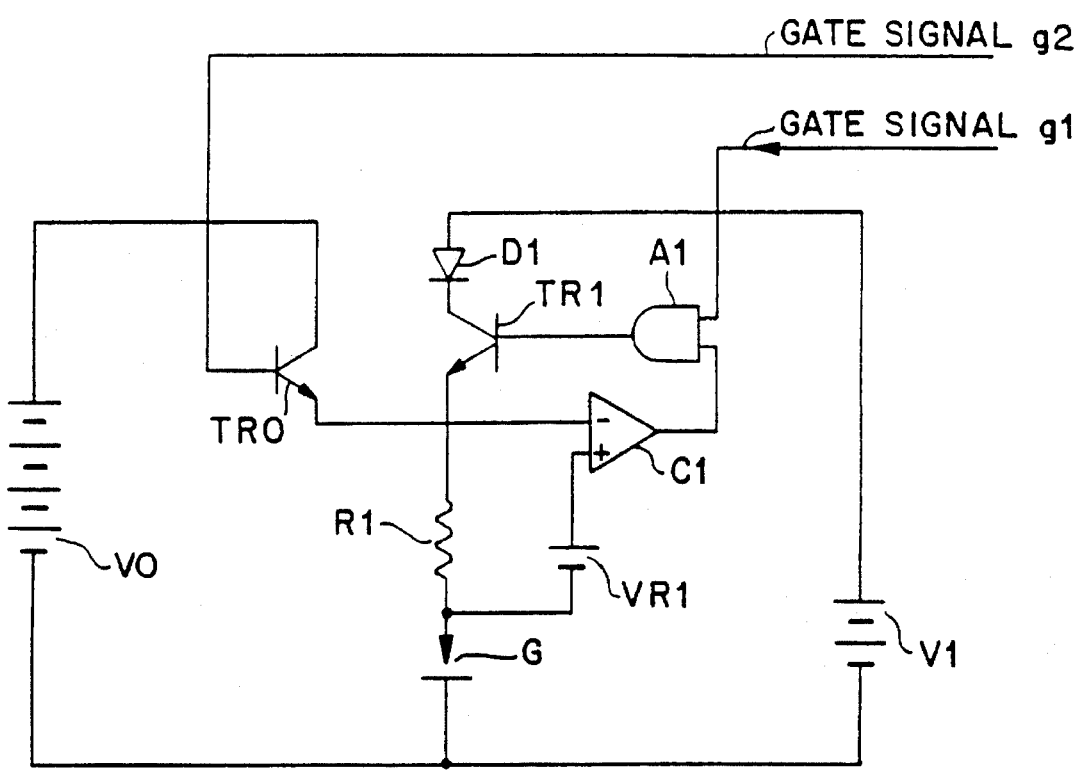
FIG. 19 is a schematic diagram of another variation of the circuit of FIG. 5.

FIG. 19 is a schematic circuit diagram of another variation of the circuit of FIG. 5. In FIG. 19, the emitters of the transistors TR0 and TR1 are connected. Therefore the gap current from power supply V0 (as well as V1) flows through current detecting resistor R1. The operation of the circuit of FIG. 19 is similar to that of the circuit of FIG. 17 except that in the circuit of FIG. 19, since gap current due to either V0 or V1 is detected, the ability of the circuit to stabilize the gap current is improved. In other words, even though TR1 is the only switch controlled in the embodiment of FIG. 19, that switch is controlled in response to gap current from V0 during the time interval defined by gate signal g2 as well as in the manner described above with regard to the embodiment of FIG. 17.

The foregoing description of a preferred embodiment of the invention has been presented for purposes of illustration and description. It is not intended to be exhaustive or to limit the invention to the precise form disclosed, and obviously many modifications and variations are possible in light of the above teaching. These embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A machining gap circuit for an electroerosion machine having a machining gap (G, 50, 140) formed by a tool electrode (E) and a workpiece electrode (WP), a power source (V1, 60, 150) for supplying machining energy to said machining gap and a means for inputting a gate signal (Gate 0) for controlling application of said power source to said gap, said gate signal comprising pulses indicative of machining pulse ON time and machining pulse OFF time, said machining gap circuit further comprising:

a switch (TR1, 140, 141) connected in series with said machining gap for controlling the flow of current through said gap;

a machining current detector (R1, 41, R11) for detecting the magnitude of said gap current:

a comparator (C1, 31, 111) for comparing the magnitude of said detected current with a reference value (VR1, D/A out, VR); and a gate means (A1, 32, 113) responsive to said comparator means and to said gate signal for operating said switch, whereby said switch is closed when said machining current is below said reference value and said gate signal is at a value indicative of a machining pulse ON time.

2. The gap circuit according to claim 1 wherein said switch comprises an electronic switch having a control electrode.

3. The gap circuit according to claim 1 wherein said machining current detector comprises a resistor connected in series with said gap and said power source.

4. The gap circuit according to claim 1 wherein said gate means comprises a logic gate responsive to said gate signal and an output of said comparator.

5. The gap power circuit according to claim 4 wherein said logic gate comprises an AND gate.

6. An electroerosion machine comprising:

a machining gap circuit comprising a power source, a rectifying device and a switching device connected in series with a machining gap formed between an electrode and a workpiece, said switching device being operable to selectively close and open in order to connect and disconnect said power source to said machining gap;

a current detector for detecting the current flowing in said machining gap circuit;

a comparator for comparing the detected current with a reference value and for generating an output indicative of said comparison;

a means for generating a gate signal, said gate signal having levels defining a machining ON time and a machining OFF time;

a logic device for driving said switching device, said logic device being responsive to said gate signal and said comparator output to open and close said switching device whereby the current in said gap circuit is controlled to a generally constant value.

7. A method of supplying machining energy to a machining gap of an electroerosion machine, said machining gap being formed by a tool electrode (E) and a workpiece electrode (WP), said method comprising the steps of:

(a) supplying machining energy to said machining gap from a power source;

(b) controlling application of said power source to said gap by means of a switch connected in series with said machining gap for controlling the flow of current to said gap, said switch being responsive to a gate signal comprising pulses indicative of a machining pulse ON time and a machining pulse OFF time;

(c) detecting the magnitude of the current flow to the machining gap;

(d) comparing the magnitude of the detected current with a reference value and outputting a comparison value; and (e) passing current to the machining gap only during a discharge by operating said switch using said gate signal and said comparison value, whereby said switch is closed when said machining current is below said reference value and said gate signal is at a value indicative of said machining pulse ON time whereby the current flow to the machining gap is controlled on a substantially instantaneous basis.

8. The method according to claim 7 wherein said switch comprises an electronic switch having a control electrode and said method further comprises the step of gating said gate signal and said comparison value and using the resulting signal to operate said switch.

9. The method according to claim 8 wherein said logical operation comprises an AND operation.

10. The method according to claim 7 wherein the step of operating the switch further comprises the step of gating said gate signal and said comparison value in accordance with a logical operation.

11. A method of electroerosion machining a workpiece in a substantially inductanceless machining circuit comprising a power source and a machining gap formed between said workpiece and a machining electrode, said method comprising the steps of:

(a) applying a voltage from said power source across said machining gap to induce electric discharges in said gap whereby current flows through said gap;

(b) detecting the magnitude of the current flow through said gap;

(c) comparing the magnitude of said current with a reference level and generating a comparison output signal; and (d) controlling the flow of said current to said gap on a substantially instantaneous basis during said discharge using said comparison output signal to maintain the magnitude of said current at a generally constant value.

12. The method according to claim 11 wherein said machining circuit further comprises a switch connected between said power source and said machining gap and wherein the step of applying comprises using a gate signal having a machining ON time and a machining OFF time wherein said voltage is only applied across said machining gap during said ON time and said step of controlling further comprises using said switch to control the flow of current to said gap during said ON time.

13. The method according to claim 12 wherein said comparison output signal comprises a series of pulses generated during said electric discharges and said step of controlling further comprises controlling the state of said switch using said series of pulses during said ON time.

14. The method according to claim 11 further comprising the step of generating a train of pulses having an ON time and an OFF time wherein the voltage from said power source is applied across said gap during the ON time and further comprising the step of interrupting the current flow at the beginning of the OFF time.

15. The method according to claim 14 wherein the step of controlling comprises intermittently interrupting the flow of current through said gap during said ON time in response to said comparison output signal.

16. A method of supplying machining energy to a machining gap of an electroerosion machine having a substantially inductanceless machining circuit, said machining gap being formed by a tool electrode (E) and a workpiece electrode (WP), said method comprising the steps of:

(a) supplying machining energy to said machining gap from a power source;

(b) controlling application of said power source to said gap by means of a switch connected in series with said machining gap for controlling the flow of current to said gap, said switch being responsive to a gate signal comprising pulses indicative of a machining pulse ON time and a machining pulse OFF time;

(c) detecting the magnitude of the current flow to the machining gap;

(d) comparing the magnitude of the detected current with a reference value and outputting a comparison value; and (e) operating said switch using said gate signal and said comparison value, whereby said switch is closed when said machining current is below said reference value and said gate signal is at a value indicative of said machining pulse ON time whereby the current flow to the machining gap is controlled on a substantially instantaneous basis.

17. A method of electroerosion machining a workpiece in a machining circuit comprising a power source and a machining gap formed between said workpiece and a machining electrode, said method comprising the steps of:

(a) applying a voltage from said power source across said machining gap to induce electric discharges in said gap whereby current flows through said gap;

(b) detecting the magnitude of the current flow through said gap;

(c) comparing the magnitude of said current with a reference level and generating a comparison output signal; and (d) passing current to the machining gap only during a discharge by controlling the flow of said current to said gap on a substantially instantaneous basis during said discharge using said comparison output signal to maintain the magnitude of said current at a generally constant value.

* * * * *